US008614778B2

(12) United States Patent
Chen et al.

(10) Patent No.: US 8,614,778 B2
(45) Date of Patent: Dec. 24, 2013

(54) PIXEL ARRAY SUBSTRATE AND LIQUID CRYSTAL DISPLAY

(75) Inventors: Chien-Hong Chen, Miao-Li County (TW); Ching-Che Yang, Miao-Li County (TW)

(73) Assignee: Chimei Innolux Corporation (TW)

( * ) Notice: Subject to any disclaimer, the term of this patent is extended or adjusted under 35 U.S.C. 154(b) by 47 days.

(21) Appl. No.: 13/081,700

(22) Filed: Apr. 7, 2011

(65) Prior Publication Data

US 2012/0050641 A1 Mar. 1, 2012

(30) Foreign Application Priority Data

Sep. 1, 2010 (TW) .............................. 99129521 A

(51) Int. Cl.
*G02F 1/1337* (2006.01)

(52) U.S. Cl.
USPC .......................................... 349/130; 349/129

(58) Field of Classification Search
None
See application file for complete search history.

(56) References Cited

U.S. PATENT DOCUMENTS 8,089,597 B2 * 1/2012 Chen et al. .................... 349/144
2009/0040407 A1 * 2/2009 Kim ............................... 349/39
2009/0322659 A1 * 12/2009 Chan et al. ...................... 345/87
2010/0053528 A1 * 3/2010 Li et al. ......................... 349/124
2011/0090448 A1 * 4/2011 Nakanishi et al. ............ 349/139

FOREIGN PATENT DOCUMENTS

TW I304902 1/2009

OTHER PUBLICATIONS

Office Action dated Jun. 27, 2013 from corresponding application No. TW 099129521.

* cited by examiner

*Primary Examiner* — Thanh-Nhan P Nguyen
(74) *Attorney, Agent, or Firm* — Lowe Hauptman & Ham, LLP

(57) ABSTRACT

A pixel array substrate and a liquid crystal display are provided. The liquid crystal display includes the pixel array substrate, an opposite substrate and a liquid crystal layer. The liquid crystal layer is disposed between the pixel array substrate and the opposite substrate. The pixel array substrate has plural pixel electrodes. Each pixel electrode has a first main portion, a second main portion, a plurality of first and second branches. The first main portion is substantially vertically connected to the second main portion and sequentially defines a first quadrant, a second quadrant, a third quadrant and a fourth quadrant. Each first branch is connected to the first main portion and/or the second main portion. The orientation angles of the first branches in the same quadrant are substantially identical. Each second branch is connected to a plurality of the first branches. Each quadrant has at least one of the second branches.

19 Claims, 4 Drawing Sheets

D2
D1
II
I
B140
B130
B120
B110
1110
III
1140
1150
1130
IV
1140
1150
1100

PIXEL ARRAY SUBSTRATE AND LIQUID CRYSTAL DISPLAY

CROSS-REFERENCE TO RELATED APPLICATION

This application claims the priority benefit of Taiwan application serial no. 99129521, filed on Sep. 1, 2010. The entirety of the above-mentioned patent application is hereby incorporated by reference herein and made a part of this specification.

BACKGROUND OF THE INVENTION

1. Field of the Invention

The present invention generally relates to a substrate and a display, in particular, to a pixel array substrate and a liquid crystal display.

2. Description of Related Art

Fast progress of the multimedia society largely benefits from the rapid development of semiconductor elements or displays. As for displays, a Thin Film Transistor Liquid Crystal Display (TFT-LCD) with superior properties, such as high definition, high space utilization efficiency, low power consumption, and no radiation, has gradually become the mainstream on the market.

Recently, a pixel electrode of some liquid crystal displays is designed to be star-shaped, as shown in FIG. 1. However, widths of each portion of a pixel electrode 100 generally are merely 3 μm to 5 μm, and once any disconnection (such as R12 and R14) occurs, a portion 110 which is in a floating state of the pixel electrode 100 cannot regulate the orientation of liquid crystal molecules, which leads to a defect. In addition, it has been found through experiments that, a liquid crystal display adopting the star-shaped pixel electrode 100 still has a problem of low light transmittance, resulting in that the image contrast cannot be improved.

SUMMARY OF THE INVENTION

Accordingly, the present invention is directed to a pixel array substrate, which can reduce the probability that a partial region of a pixel electrode is in a floating state due to defects produced during manufacturing.

The present invention is also directed to a liquid crystal display, which can address the problem of low light transmittance when a star-shaped pixel electrode is adopted.

The pixel array substrate of the present invention has a plurality of pixel electrodes. Each pixel electrode has a first main portion, a second main portion, a plurality of first branches and a plurality of second branches. The first main portion is substantially vertically connected to the second main portion and sequentially defines a first quadrant, a second quadrant, a third quadrant and a fourth quadrant. Each first branch is connected to the first main portion or the second main portion. The orientation angles of the first branches in the same quadrant are substantially identical. Each second branch is connected to a plurality of the first branches. Each quadrant has at least one of the second branches.

The liquid crystal display of the present invention includes the pixel array substrate, an opposite substrate and a liquid crystal layer.

In an embodiment of the present invention, the orientation angles of the first branches in the first quadrant are between 40 degrees and 50 degrees, the orientation angles of the first branches in the second quadrant are between 130 degrees and 140 degrees, the orientation angles of the first branches in the third quadrant are between 220 degrees and 230 degrees, and the orientation angles of the first branches in the fourth quadrant are between 310 degrees and 320 degrees.

In an embodiment of the present invention, the second branch in each quadrant is substantially vertically connected to the first branches in each quadrant.

In an embodiment of the present invention, each quadrant has a plurality of the second branches, and the orientation angles of the second branches in the same quadrant are substantially identical. In addition, a pitch between the second branches in the same quadrant is, for example, 10 μm.

In an embodiment of the present invention, a distance between the same sides of two adjacent first branches in the same quadrant is 5 μm to 7 μm.

In an embodiment of the present invention, a width of each first branch is 2 μm to 3.5 μm.

In an embodiment of the present invention, a width of each second branch is 2 μm to 10 μm.

In an embodiment of the present invention, each pixel electrode further has an outer frame, surrounding a periphery of the pixel electrode and connected to the first main portion, the second main portion and the first branches.

In an embodiment of the present invention, the liquid crystal display further includes a back light module, and the pixel array substrate and the opposite substrate are disposed on the back light module.

Based on the above, in the pixel array substrate and the liquid crystal display of the present invention, the design of the second branches reduces the probability that a partial region of the pixel electrodes is in a floating state, and also improves the contrast of displayed images.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
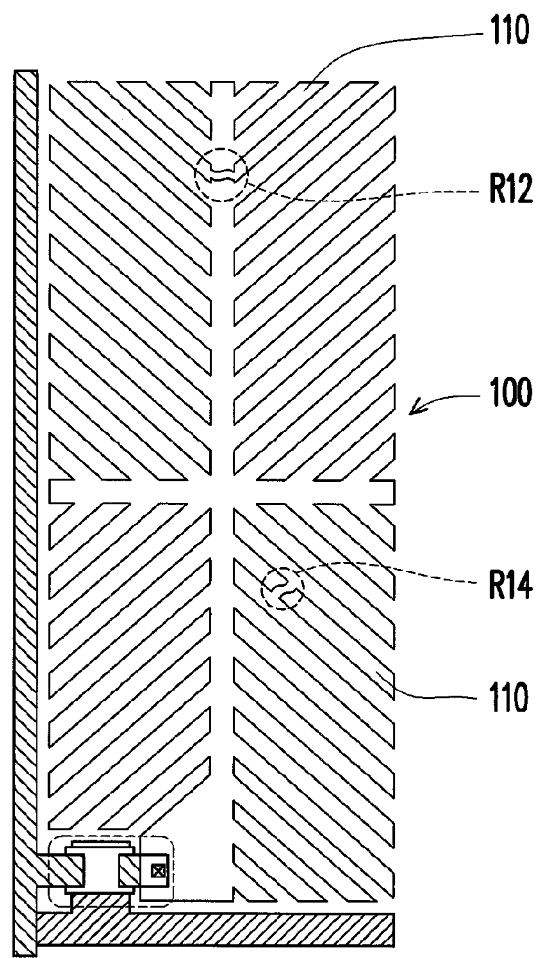
FIG. 1 is a schematic partial top view of a conventional pixel array substrate.

Reference will now be made in detail to the present embodiments of the invention, examples of which are illustrated in the accompanying drawings. Wherever possible, the same reference numbers are used in the drawings and the description to refer to the same or like parts.

Figure 2:
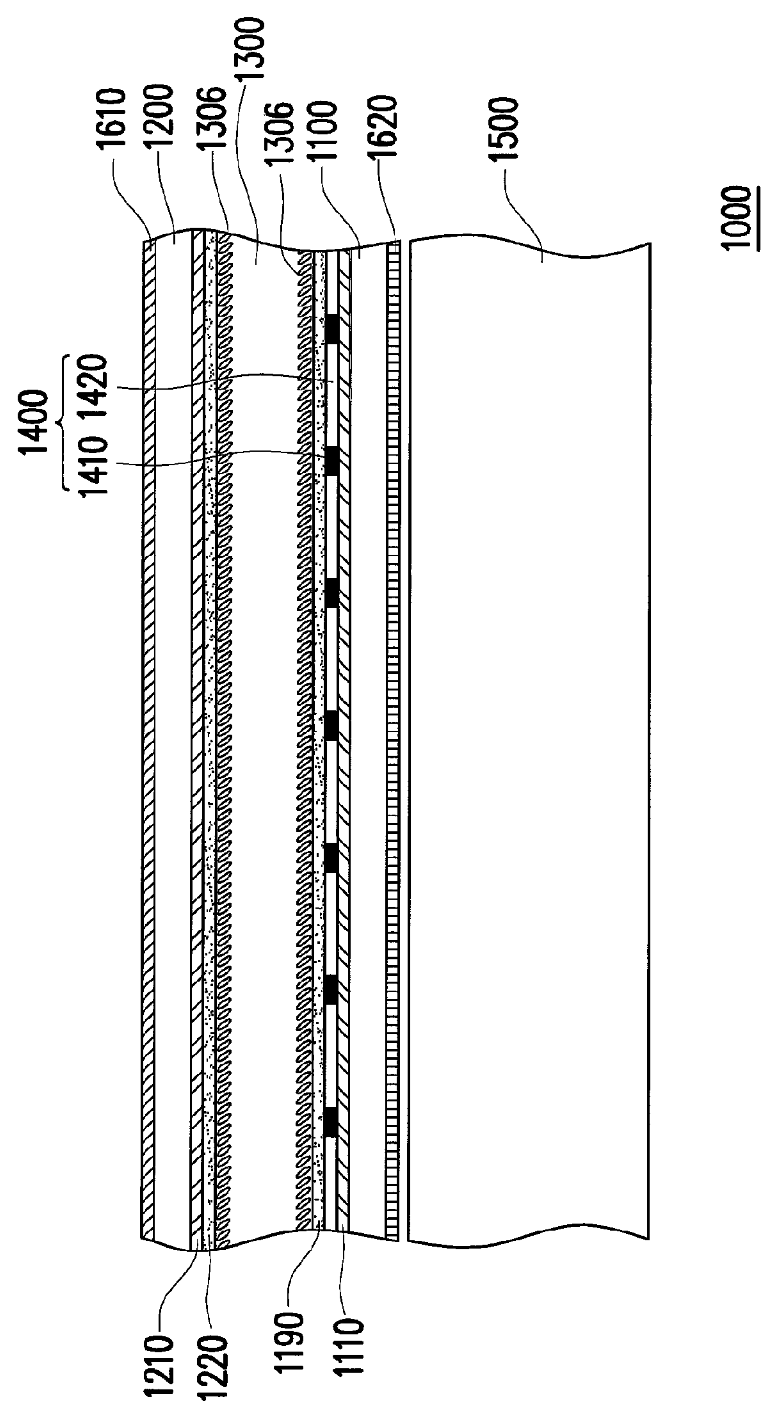
FIG. 2 is a partial sectional view of a liquid crystal display according to an embodiment of the present invention.

FIG. 2 is a partial sectional view of a liquid crystal display according to an embodiment of the present invention. Referring to FIG. 2, a liquid crystal display 1000 of this embodiment includes a pixel array substrate 1100, an opposite substrate 1200 and a liquid crystal layer 1300. The pixel array substrate 1100 has a plurality of pixel electrodes 1110, and in FIG. 2, a single layer is used to represent a plurality of pixel electrodes 1110 for simplicity. The opposite substrate 1200 has a common electrode 1210 facing the pixel array substrate 1100. In addition, an alignment layer 1190 may be disposed on the pixel array substrate 1100 of this embodiment, and an alignment layer 1220 may be disposed on the opposite substrate 1200. The alignment layer 1220 covers the common electrode 1210, and is close to the liquid crystal layer 1300. The alignment layer 1190 covers the pixel electrodes 1110, and is close to the liquid crystal layer 1300. The liquid crystal layer 1300 is disposed between the pixel electrodes 1110 of the pixel array substrate 1100 and the common electrode 1210 of the opposite substrate 1200. If the liquid crystal display 1000 adopts a transmissive type design or a transflective type design, the liquid crystal display 1000 may further include a backlight module 1500 to provide a surface light source, and the pixel array substrate 1100 and the opposite substrate 1200 are disposed on the backlight module 1500.

In addition, the liquid crystal display 1000 may further include a color filter layer 1400. The color filter layer 1400 may include a black matrix 1410 and a plurality of color filter films 1420. The black matrix 1410 has openings capable of accommodating the color filter films 1420. In this embodiment, the color filter layer 1400 is, for example, disposed on the pixel array substrate 1100; however, the color filter layer 1400 may also be disposed on the opposite substrate 1200 and located between the opposite substrate 1200 and the common electrode 1210.

The liquid crystal display 1000 of this embodiment further includes two liquid crystal stabilizing polymer layers 1306, formed on the common electrode 1210 and the pixel electrodes 1110 and in contact with the liquid crystal layer 1300. However, the liquid crystal display 1000 may also have only one liquid crystal stabilizing polymer layer 1306, which may be disposed on the common electrode 1210 or the pixel electrodes 1110.

For forming the liquid crystal stabilizing polymer layer 1306, a plurality of reactive monomers (not shown) may be uniformly doped in the liquid crystal layer 1300 first. The reactive monomers form the liquid crystal stabilizing polymer layer 1306 on a surface of the pixel array substrate 1100 and/or the opposite substrate 1200 through polymerization process. During the polymerization process, a voltage difference is applied to the pixel electrodes 1110 and the common electrode 1210 and generating an electric field on the liquid crystal layer 1300, so that liquid crystal molecules of the liquid crystal layer 1300 will be tilted according to the generated electric field, and at the same time, the reactive monomers are polymerized into the liquid crystal stabilizing polymer layer 1306 by ultraviolet radiation, heating, or other appropriate methods. The method for polymerizing the reactive monomers depends on the material characteristics of the reactive monomers what we used. As such, the liquid crystal molecules near the polymerized reactive monomers are maintained at a tilt angle when the reactive monomers are polymerized. The liquid crystal stabilizing polymer layer 1306 helps to enhance an anchoring force of the alignment layer 1220 and the alignment layer 1190 to the liquid crystal molecules of the liquid crystal layer 1300, and thus can stabilize the tilt direction of the liquid crystal molecules and improve the response speed of the liquid crystal molecules. Whereby, the common electrode 1210 may completely cover the opposite substrate 1200 without forming any pattern. Thus, the liquid crystal display 1000 can have a higher transmittance and a higher response speed, thus alleviating the image retention phenomenon.

When the liquid crystal stabilizing polymer layer 1306 formed on the surfaces of the alignment layer 1220 and the alignment layer 1190 during a voltage difference is applied to the pixel electrodes 1110 and the common electrode 1210, the liquid crystal stabilizing polymer layers 1306 will be formed a polymeric structure approximately along the tilt direction implied by the pixel electrodes 1110 (to be further described later). Therefore, when the electric field applied on the liquid crystal layer 1300 disappears, the liquid crystal stabilizing polymer layers 1306 on the alignment layer 1220 and the alignment layer 1190 will make the liquid crystal molecules back to a predetermined orientation quickly, and thus assist the liquid crystal molecules of the liquid crystal layer 1300 to make a next response quickly. As such, the response time of the liquid crystal molecules is further reduced, and the image retention phenomenon is further alleviated. With the assistance of the liquid crystal stabilizing polymer layers 1306, a desirable alignment effect can be achieved with a low cost, and thus, the manufacturing cost of the whole liquid crystal display 1000 can be reduced.

The liquid crystal display 1000 of this embodiment further includes a first polarizing plate 1610 and a second polarizing plate 1620. The first polarizing plate 1610 is disposed on a surface of the opposite substrate 1200 away from the liquid crystal layer 1300, that is, the first polarizing plate 1610 and the liquid crystal layer 1300 are respectively located on two opposite surfaces of the opposite substrate 1200. The second polarizing plate 1620 is disposed on a surface of the pixel array substrate 1100 away from the liquid crystal layer 1300, that is, the second polarizing plate 1620 and the liquid crystal layer 1300 are respectively located on two opposite surfaces of the pixel array substrate 1100. The first polarizing plate 1610 and the second polarizing plate 1620 are, for example, linear polarizing plates, each having a transmission axis for selectively allowing light to pass through the polarizing plates, and the first polarizing plate 1610 and the second polarizing plate 1620 are disposed in such a manner that the transmission axes of the two are orthogonal to each other. Alternatively, the first polarizing plate 1610 and the second polarizing plate 1620 may also be circular polarizing plates.

Figure 3:
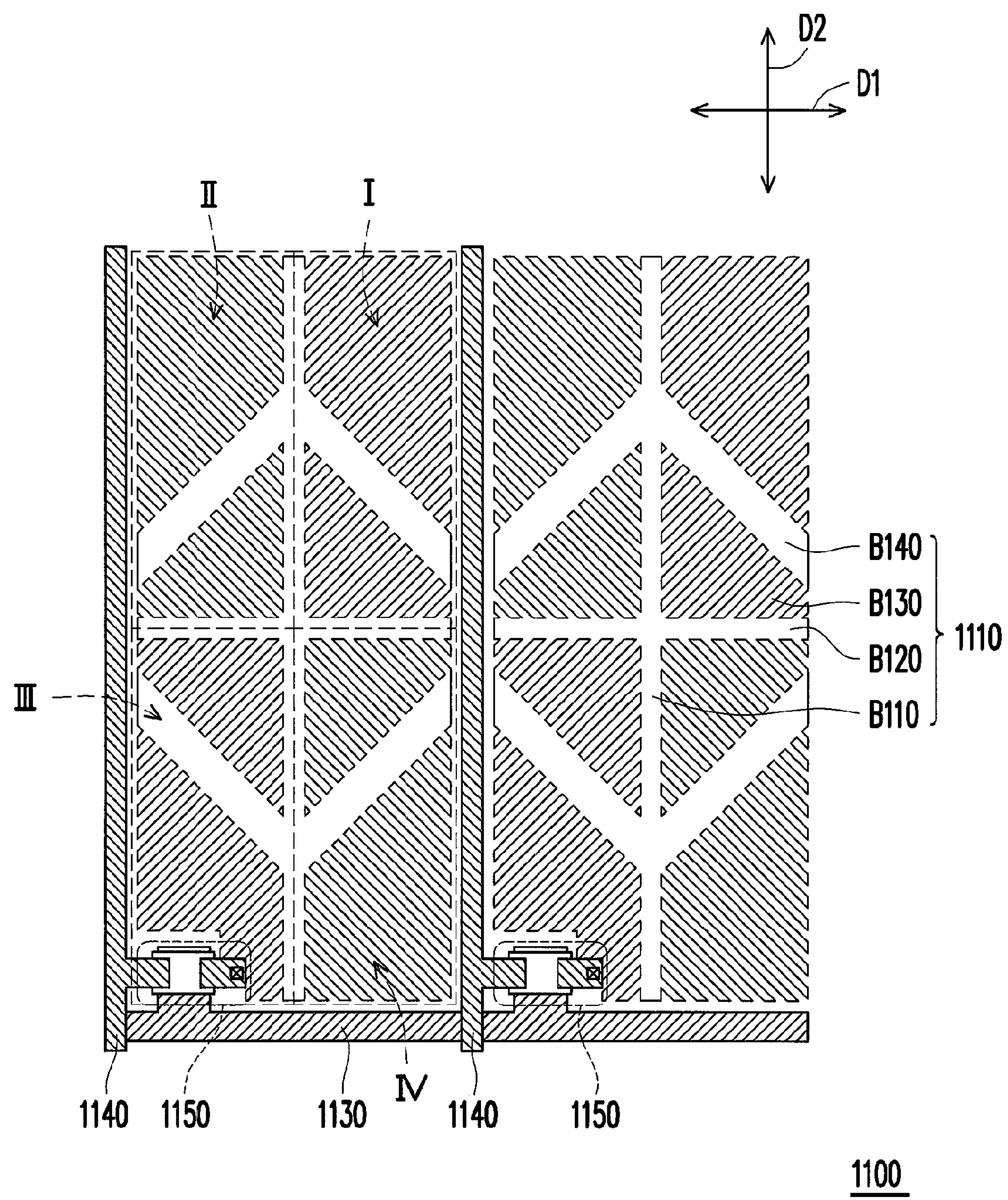
FIG. 3 is a schematic partial top view of a pixel array substrate of the liquid crystal display in FIG. 2.

FIG. 3 is a schematic partial top view of a pixel array substrate 1100 of the liquid crystal display 1000 in FIG. 2. Referring to FIG. 3, each pixel electrode 1110 of the pixel array substrate 1100 has a first main portion B110, a second main portion B120, a plurality of first branches B130, and a plurality of second branches B140. Each first branch B130 is connected to the first main portion B110 and/or the second main portion B120. The first main portion B110 is substantially vertically connected to the second main portion B120 and defines four quadrants, that is, a first quadrant I, a second quadrant II, a third quadrant III and a fourth quadrant IV. A pattern formed by the first main portion B110, the second main portion B120 and the first branches B130 of each pixel electrode 1110 is substantially star-shaped. By taking the second main portion B120 as a reference, the orientation angles of the first branches B130 in each quadrant are substantially identical. The first branches B130 substantially radiate outwards from an intersection of the first main portion B110 and the second main portion B120. For example, in each single quadrant, part of the first branches B130 are connected to the first main portion B110, and other first branches B130 are connected to the second main portion B120.

Each second branch B140 is connected to a plurality of the first branches B130, and each quadrant has at least one of the second branches B140. In addition, D1 is a direction of the transmission axis of the first polarizing plate 1610 in FIG. 2, D2 is a direction of the transmission axis of the second polarizing plate 1620 in FIGS. 2, and D1 and D2 are orthogonal to each other, and respectively define 0 degree and 90 degrees.

Since the second branch B140 is connected to a plurality of the first branches B130, even if a disconnection occurs during manufacturing of the pixel electrodes 1110, portions around the disconnection can be connected through the second branch B140 in most cases. As such, the probability that a partial region of the pixel electrodes 1110 is in a floating state due to defects produced during manufacturing is significantly reduced, so as to ensure a satisfactory arrangement of the liquid crystal molecules, thus providing a desirable display quality. In addition, it has been found through experiments that, with the additional configuration of the second branches B140, the pixel electrodes 1110 can provide a better regulation to the liquid crystal molecules, thus improving the light transmittance and the contrast of displayed images.

Referring to FIG. 3 again, the pixel array substrate 1100 of this embodiment may further have a plurality of scan lines 1130, a plurality of data lines 1140 and a plurality of active elements 1150, but FIG. 3 only shows one scan line 1130 by way of example. Each active element 1150 is driven by a corresponding scan line 1130. Each pixel electrode 1110 is electrically coupled to a corresponding active element 1150, so as to receive a signal transmitted by a corresponding data line 1140. The material of the pixel electrodes 1110 of this embodiment is a transparent conductive material, such as indium tin oxide (ITO) or indium zinc oxide (IZO), but the present invention is not limited thereto. When the material of the pixel electrodes 1110 is IZO, a small line width can be easily achieved.

In an embodiment of the present invention, the orientation angles of the first branches B130 in the quadrants are sequentially 45 degrees, 135 degrees, 225 degrees, and 315 degrees with respect to the second main portion B120. The orientation angles of the first branches B130 in each quadrant depend on the configuration of the transmission axis D1 of the first polarizing plate 1610 and the transmission axis D2 of the second polarizing plate 1620, and are preferably, 45 degrees with respect to the transmission axis D1 or D2. The second branch B140 in each quadrant is connected to the first branches B130 in the same quadrant, and preferably, is vertically connected to the first branches B130. Therefore, the orientation angles of the second branches B140 in the quadrants are sequentially 135 degrees, 45 degrees, 315 degrees, and 225 degrees, but the present invention is not limited thereto. It should be noted that, the orientation angles herein may allow a tolerance, which is, for example, ±5 degrees, and preferably ±1.5 degrees. The orientation angles of the first branches B130 in the first quadrant I may be between 40 degrees and 50 degrees, the orientation angles of the first branches B130 in the second quadrant II may be between 130 degrees and 140 degrees; the orientation angles of the first branches B130 in the third quadrant III may be between 220 degrees and 230 degrees; and the orientation angles of the first branches B130 in the fourth quadrant IV may be between 310 degrees and 320 degrees. In addition, the orientation angles of the first branches B130 and the second branches B140 in FIG. 3 are not completely drawn to scale, but FIG. 3 is merely used to represent a sketchy pattern of the pixel electrodes 1110.

Figure 4:
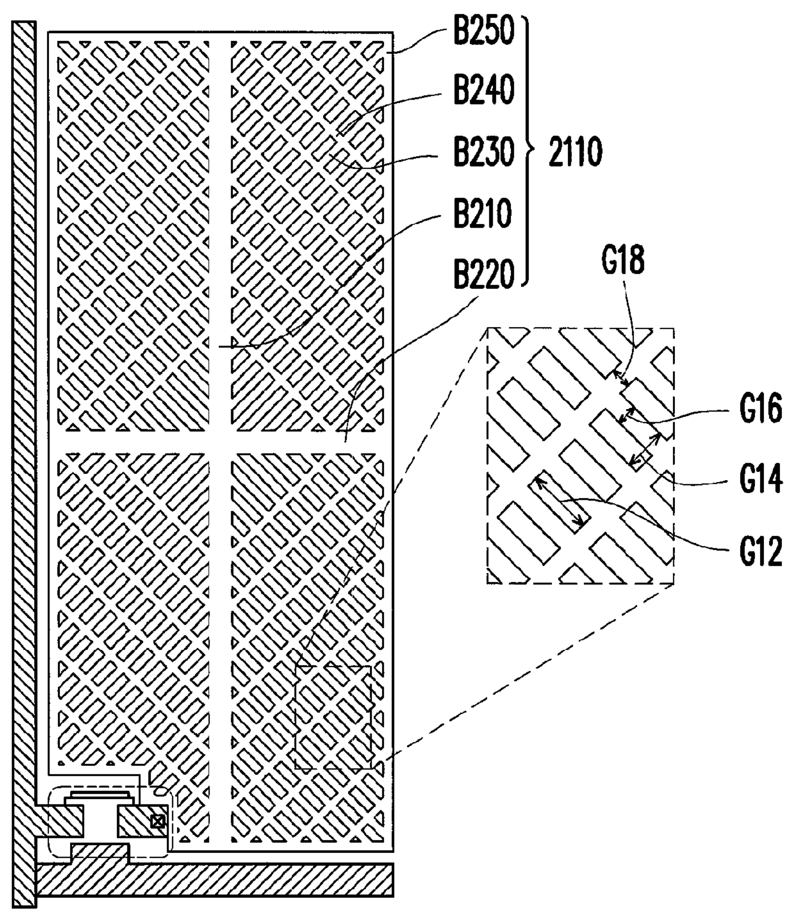
FIG. 4 is a schematic partial top view of a pixel array substrate according to another embodiment of the present invention.

FIG. 4 is a schematic partial top view of a pixel array substrate according to another embodiment of the present invention. Referring to FIG. 4, a pixel array substrate 2100 of this embodiment is similar to the pixel array substrate 1100 in FIG. 3, and the description of same parts will be omitted herein. Each pixel electrode 2110 of the pixel array substrate 2100 of this embodiment has a first main portion B210, a second main portion B220, a plurality of first branches B230, a plurality of second branches B240 and an outer frame B250. The outer frame B250 surrounds a periphery of the pixel electrode 2110, and is connected to the first main portion B210, the second main portion B220, the first branches B230 and at least one of the second branches B240. In other embodiments, if the second branch B240 does not extend to the periphery of the pixel electrode 2110, the outer frame B250 is not connected to the second branch B240. Each quadrant has a plurality of the second branches B240, and the orientation angles of the second branches B240 in the same quadrant are substantially identical.

By increasing the number of the second branches B240 and additionally providing the outer frame B250, the pixel array substrate 2100 further reduces the probability that a partial region of the pixel electrodes 2110 is in a floating state due to defects produced during manufacturing, and also provides a better regulation to the liquid crystal molecules, thus improving the light transmittance and the contrast of displayed images.

Various dimensions of the pixel electrodes 2110 of this embodiment are described hereinafter, but the present invention is not limited thereto. A pitch G12 between the second branches B240 in the same quadrant is, for example, 10 μm. A distance G14 between the same sides of two adjacent first branches B230 in the same quadrant is 5 μm to 7 μm. A width G16 of each first branch B230 is 2 μm to 3.5 μm. A width G18 of each second branch B240 is 2 μm to 10 μm, and preferably 5 μm.

Based on the above, in the pixel array substrate and the liquid crystal display of the present invention, the second branch is connected to a plurality of the first branches, so that the probability that a partial region of the pixel electrodes is in a floating state due to the disconnection can be reduced, and a better regulation to the liquid crystal molecules can be provided, thus improving the contrast of displayed images.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel array substrate, comprising a plurality of pixel electrodes, each pixel electrode comprises:

a first main portion;

a second main portion, the second main portion is substantially vertically connected to the first main portion and sequentially defines a first quadrant, a second quadrant, a third quadrant and a fourth quadrant;

a plurality of first branches, each first branch of the plurality of first branches is connected to the first main portion or the second main portion, and orientation angles of each first branch of the plurality of first branches in a same quadrant are substantially identical; and a plurality of second branches, each second branch of the plurality of second branches is connected to several first branches of the plurality of first branches, an included angle between each second branch of the plurality of second branches and the several first branches is 85 degrees to 95 degrees, each quadrant comprises at least one of second branch of the plurality of second branches, and two sides of one second branch of the plurality of second branches are connected to several first branches of the plurality of first branches in the same quadrant.

2. The pixel array substrate according to claim 1, wherein orientation angles of first branches of the plurality of first branches in the first quadrant are between 40 degrees and 50 degrees, orientation angles of first branches of the plurality of first branches in the second quadrant are between 130 degrees and 140 degrees, orientation angles of first branches of the plurality of first branches in the third quadrant are between 220 degrees and 230 degrees, and orientation angles of first branches of the plurality of first branches in the fourth quadrant are between 310 degrees and 320 degrees.

3. The pixel array substrate according to claim 1, wherein a second branch of the plurality of second branches in each quadrant is substantially vertically connected to first branches of the plurality of first branches in the same quadrant.

4. The pixel array substrate according to claim 1, wherein each quadrant comprises several second branches of the plurality of second branches, and the orientation angles of the several second branches in a same quadrant are substantially identical.

5. The pixel array substrate according to claim 4, wherein a pitch between the several second branches of the plurality of second branches in the same quadrant is 10 μm.

6. The pixel array substrate according to claim 1, wherein a sum of a distance between two adjacent first branches of the plurality of first branches in the same quadrant and a width of each first branch of the plurality of first branches is 5 μm to 7 μm.

7. The pixel array substrate according to claim 1, wherein a width of each first branch of the plurality of first branches is 2 μm to 3.5 μm.

8. The pixel array substrate according to claim 1, wherein a width of each second branch of the plurality of second branches is 2 μm to 10 μm.

9. The pixel array substrate according to claim 1, wherein each pixel electrode further comprises an outer frame, surrounding a periphery of the pixel electrode and connected to the first main portion, the second main portion and the plurality of first branches.

10. A liquid crystal display, comprising:

a pixel array substrate, the pixel array substrate comprising a plurality of pixel electrodes, each pixel electrode of the plurality of pixel electrodes comprises:

a first main portion;

a second main portion, the second main portion is substantially vertically connected to the first main portion and sequentially defines a first quadrant, a second quadrant, a third quadrant and a fourth quadrant;

a plurality of first branches, each first branch of the plurality of first branches is connected to the first main portion or the second main portion, and orientation angles of each first branch the plurality of first branches in a same quadrant are substantially identical; and a plurality of second branches, two sides of one second branch of the plurality of second branches are connected to several first branches of the plurality of first branches in the same quadrant, an included angle between each second branch of the plurality of second branches and the several first branches is 85 degrees to 95 degrees, and each quadrant comprises at least one of second branch of the plurality of second branches;

an opposite substrate; and a liquid crystal layer disposed between the pixel array substrate and the opposite substrate.

11. The liquid crystal display according to claim 10, wherein the orientation angles of first branches of the plurality of first branches in the first quadrant are between 40 degrees and 50 degrees, orientation angles of first branches of the plurality of first branches in the second quadrant are between 130 degrees and 140 degrees, orientation angles of first branches of the plurality of first branches in the third quadrant are between 220 degrees and 230 degrees, and orientation angles of first branches of the plurality of first branches in the fourth quadrant are between 310 degrees and 320 degrees.

12. The liquid crystal display according to claim 10, wherein a second branch of the plurality of second branches in each quadrant is substantially vertically connected to the first branches of the plurality of first branches in the same quadrant.

13. The liquid crystal display according to claim 10, wherein each quadrant comprises several second branches of the plurality of second branches, and orientation angles of the several second branches of the plurality of first branches in a same quadrant are substantially identical.

14. The liquid crystal display according to claim 13, wherein a pitch between the several second branches of the plurality of second branches in the same quadrant is 10 μm.

15. The liquid crystal display according to claim 10, wherein a sum of a distance between two adjacent first branches in the same quadrant and a width of each first branch is 5 μm to 7 μm.

16. The liquid crystal display according to claim 10, wherein a width of each first branch of the plurality of first branches is 2 μm to 3.5 μm.

17. The liquid crystal display according to claim 10, wherein a width of each second branch of the plurality of second branches is 2 μm to 10 μm.

18. The liquid crystal display according to claim 10, wherein each pixel electrode further comprises an outer frame, surrounding a periphery of the pixel electrode and connected to the first main portion, the second main portion and the plurality of first branches.

19. The liquid crystal display according to claim 10, further comprising a backlight module, wherein the pixel array substrate and the opposite substrate are disposed on the backlight module.

* * * * *